(12) United States Patent
Patil et al.

(10) Patent No.: US 8,566,347 B1
(45) Date of Patent: Oct. 22, 2013

(54) METHOD AND APPARATUS FOR STORING ONTOLOGIES IN A RELATIONAL DATABASE

(75) Inventors: Abhijit Ashok Patil, Alpharetta, GA (US); Sreenivasa Rao Pragada, Irvington, NY (US); Raju Venkata Rama Raju Gopala Gottumukkala, Cumming, GA (US); Kaliki Murthy Aritakula, Cumming, GA (US); Viswanath Dasari, Alpharetta, GA (US)

(73) Assignee: Semantifi, Inc., Stamford, CT (US)

( * ) Notice: Subject to any disclaimer, the term of this patent is extended or adjusted under 35 U.S.C. 154(b) by 32 days.

(21) Appl. No.: 13/211,564

(22) Filed: Aug. 17, 2011

Related U.S. Application Data

(60) Provisional application No. 61/374,595, filed on Aug. 17, 2010.

(51) Int. Cl.
*G06F 17/30* (2006.01)
(52) U.S. Cl.
USPC .......................... 707/769; 707/776; 707/794

(58) Field of Classification Search
USPC .......................................... 707/769, 776, 794
See application file for complete search history.

(56) References Cited

U.S. PATENT DOCUMENTS

| 2008/0104032 A1* | 5/2008 | Sarkar | 707/3 |
| 2008/0168420 A1* | 7/2008 | Sabbouh | 717/104 |
| 2011/0040796 A1* | 2/2011 | Shockro et al. | 707/794 |

\* cited by examiner

*Primary Examiner* — Monica Pyo
(74) *Attorney, Agent, or Firm* — Gordon Kessler (57) ABSTRACT

A method and apparatus for storing ontologies in a relational database. The method includes the steps of defining one or more instances, defining one or more concepts realized as instances, defining one or more relationships that may be employed between one or more instances, defining one or more relationships that may be employed between one or more concepts, and storing in a relational database each of the one or more instances, concepts, and relationships between the instances or concepts. One or more relationships may be indicated that do not apply to one or more pair of concepts.

19 Claims, 4 Drawing Sheets

| Owl Construct | Inventive Equivalent |
|---|---|
| RDF Schema Features | |
| Class | Concept, Type and Behavior Tables |
| Property | Relation Table |
| Individual | Instance Table |
| Domain | Source-Entity column in a Triple |
| Range | Destination-Entity column in a Triple |
| subClass | parentResource association between Concepts |
| subProperty | parentResource association between Relations |
| Datatypes | |
| xsd datatypes | Some of the TYPEs |
| (In)Equality | |
| equivalentClass | equivalentResource association between Concepts |
| equivalentProperty | equivalentResource association between Relations |
| sameAs | equivalentResource association between Instances, Also can be addresses by specifying Synonyms in Parallel Words table |
| differentFrom | This application assumes Instances to be different from each other unless specified otherwise. |
| AllDifferent | mutuallyExclusiveResource association can be applied not only to Instances but can also be applied to Concepts and Relations, essentially giving ability to exclude one Relation if other is already attached, or stop user from grouping Concepts which should not be Unioned. |
| Property Characteristics | |
| InverseFunctionalProperty | Inverse Functional Behavior on Relation Entity |
| FunctionalProperty | Functional Behavior on Relation Entity |
| SymmetricProperty | Symmetric Behavior on Relation Entity |
| ObjectProperty | Triples with Destination as a Concept |
| DatatypeProperty | Triples with Destination as Attribute. Attribute is Realization of Attribute TYPEs like NUMBER, TEXT, TIME etc. |
| inverseOf | inverseResource association between Relations |
| TransitiveProperty | Transitive Behavior on Relation Entity |
| Restricted Cardinality | |
| minCardinality | Minimum Cardinality Column in Triples |
| maxCardinality | Maximum Cardinality Column in Triples |
| Cardinality | Cardinality Column in Triples |
| Boolean Combinations of Class Expressions | |
| intersectionOf | Concept Cloud with intersection validation rule |
| unionOf | Concept Cloud containing component concepts |
| complementOf | inverseResource association between Concepts |
| disjointWith | mutuallyExclusiveResource association between Concepts |
| Property Restrictions | |
| Restriction | Written as Validation rules on a specific Triple |
| onProperty | |
| someValuesFrom | Validation Rule |
| allValuesFrom | Validation Rule |
| Class Restrictions | |
| hasValue | Class validation rule |

METHOD AND APPARATUS FOR STORING ONTOLOGIES IN A RELATIONAL DATABASE

CROSS REFERENCE TO RELATED APPLICATIONS

This application claims the benefit of U.S. Provisional Patent Application Ser. No. 61/374,595 filed 17 Aug. 2010 to Patil et al. titled "Method and Apparatus for Storing Ontologies in a Relational Database", the entire contents thereof being incorporated herein by reference.

FIELD OF THE INVENTION

Embodiments of this invention relate generally to the generation and storage of ontologies and more particularly to a method and apparatus for efficiently storing expanded content ontologies in a relational database.

BACKGROUND OF THE INVENTION

Ontologies are conceptualizations of the real world. The simplest way to capture knowledge present in the real world is to capture entities and interactions between them. The easiest way to achieve this is to capture interaction between any two entities. This is the simplest way to create a sentence in English, with subject, predicate and object. This is also called as a Triple as it involves three components (two entities and in indication of relationship between them). Any event in the real world can be captured with such simple sentences giving us such triples. Ontologies provide us a way to capture these entities and triples in a format that can be used further by machines for various purposes.

There are many standards proposed and in use for capturing Ontologies. Most of these standards are XML based in order to achieve platform independence and portability. The most commonly used standard is OWL/RDF or Web Ontology Language. OWL/RDF provides a reach schema in order to capture ontological information but at the same time is plagued with some shortcomings, such as scalability.

Ontological entities are generally categorized as Concepts, Relations and Instances. Concepts are the real world entities at a generic level, for example, Person, Car etc. Relations are the interactions between concepts; for example, Person drives a Car. Instances are the concretization of the concepts at different levels; for example, Honda is a Car, Toyota is a Car, John is a Person etc. Interactions are also called as Associations and they result into Triples i.e. Subject-Predicate-Object format. In the current example "Person-Drives-Car" is a triple with "Person" is the Subject, and thus the originator of the interaction, "Drives" is the predicate i.e. the defined interaction between the subject and the object, and Car becomes "Object" i.e. the entity on which the interaction is being performed. As one can see a triple gives an interaction possibility between two entities. Here it is important to note that the interaction is presented as a possibility only because not every person will drive every car. Hence, it is necessary to capture the interactions at actual Instance level as well. For example, John may drive only Honda and not Toyota. These Instance level interactions are captured as instance triples separately from the broader concept triples. Also it is important to note that concepts and instances are dependent on the context in which they are being modeled. This means, one can model Car as concept in context of auto-shopping and one can model the same Car as instance of a vehicle in case of travel context. Thus, depending on the generic nature of the context, concepts and instances are modeled.

There have been many efforts to store ontology information in other formats. Most common are the proposals to store ontology information in relational databases. There have also been efforts to store RDF graphs in relational databases. Most of these efforts like Sesame; RDQL etc. are triple centric approaches. They store triples as three columns in a table and most querying revolves around this structure. Most of these approaches assume that user is well versed with RDF and want to query in or using RDF like constructs. Additionally, this RDF based querying becomes slower and slower as the size of content being queried increases. As will be discussed below, the present application differs from prior solutions, enabling a common computer user to be able to ask questions without knowing how to query in RDF. These existing techniques have been evaluated many times, substantial literature being available describing them. An evaluation of existing ontology storage approaches is provided at "*Ontology Storage and Querying*" by Magkanaraki et.al. Similarly another proposal for storing RDF in a database can be found at "*RDF Data-Centric Storage*" by Levandoski et.al.

There are a few other approaches "*Storage and Querying of E-Commerce Data*" by R. Agrawal et.al., "*From Ontology to Relational Databases*" by A. Gali et.al., where Ontology may be stored as a relational database, where each class with properties becomes a Table and data-type properties become columns. Object properties are represented as foreign key constraints. Instances become rows in these tables. In this approach, even though querying in simpler than using EDF querying languages, one has to be well aware of the particular schema of the particular ontology and the resulting relational database is tightly coupled to that schema. In accordance with various embodiments of the present invention, a newer approach to store Ontology in relational databases is provided.

Therefore, it would be desirable to provide a method and apparatus that overcomes these noted drawbacks of the prior art and allows for efficient and effective storage of ontologies in a relational database.

SUMMARY OF THE INVENTION

The Semantic Web is a vision of the World Wide Web in which data is described with rich semantics and applications can pose complex queries to get answers. Ontologies are a most important tool for this vision to become reality. Ontology is a "formal, explicit specification of a shared conceptualization". Ontology provides a shared vocabulary, which can be used to model a domain. Ontology describes entities i.e. concepts, their instances and properties and relations among them. As noted above, standard languages used for specifying Ontologies are OWL and RDF. This knowledge is used further with help of inference engines for Semantic Web Applications. Ontology is generally represented as a Graph, generated through the daisy chaining of the various stored triples to form an interwoven graph based upon the various relationships between the concepts and instances in the included triples. The inventors of the present invention have recognized that traversing this Graph in real time for performing inference is generally not scalable because the size of the graph grows substantially in accordance with the amount of data, and therefore number of triples, to be represented by the graph. This is why there have been many attempts to store this ontology in formats other than XML based; most commonly in relational databases. Most of these approaches still expect the user to be aware of RDF and convert underlying querying syntax to make it look more like RDF. Embodiments of the present invention overcome this problem, and present a new way of storing Ontologies in a relational database that will aid the user so that they are able to query without knowing RDF.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which:

FIG. 3 is a table depicting differences between handling of various ontological elements by the prior art and embodiments of the present invention.

DETAILED DESCRIPTION OF THE PREFERRED EMBODIMENTS

In accordance with one or more embodiments of the present invention, the following features may be employed for storing entities (i.e. concepts), instances, and relations. Various embodiments of the present invention may be employed in accordance with the knowledge framework described in U.S. patent application Ser. No. 13/211,535, titled "Knowledge Framework", filed Aug. 17, 2011 to Pragada et al., the entire contents thereof being incorporated herein by reference.

Figure 1A:
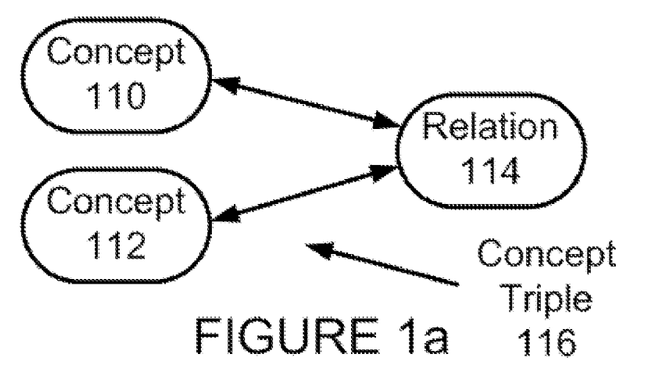
FIGS. 1a, 1b and 1c are representations of various ontological relationships.
Figure 1B:
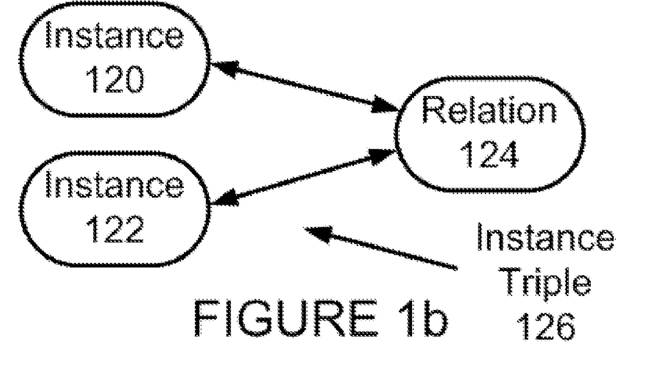
Figure 1C:
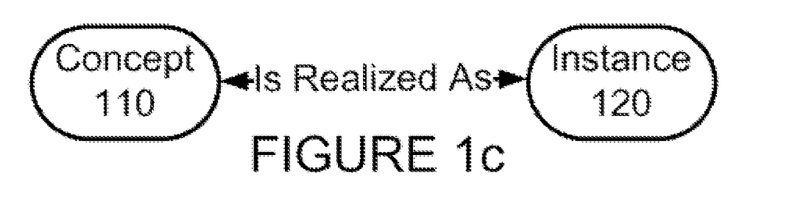

Referring first to FIG. 1a, a representation of a concept triple, ontological relationship as is well known in the prior art is shown. A concept 110 may be provided, indicative of a thing that may be present in the real world, such as "person." A concept 110 may be related another concept 112 as designated by relation 114. Thus, for example, taking the concept 'person" from above, and adding a second concept "house", a relationship may indicate that "person owns house", thus defining a relationship between two concepts. Such relationships are referred to as ontological triples, and in this case, as concept triples 116. Further referring to FIG. 1c, each concept 110 may be realized as an instance 120, such as, in this case, "person" being realized as "John." Thus, the concept 110 may be realized as the instance 120. Any concept may be realized as any number of instances. Thus, in accordance with this example, instances 120 may comprise "Steven", "Joan", etc. As is shown in FIG. 1b, a particular instance 120 may be related another concept 122 as designated by relation 124. Such a relationship is referred to an ontological triple, and in this case, an instance triple 126. In keeping with the above example, "John owns the house on the corner", thus defining with particularity the particular person and the particular house. Such a relationship is again referred to as an instance triple An Instance is a specific visualization of a concept for example, Cat, Dog can be instances of Animal, Honda and Toyota can be instances of Car. Similarly, 30005, 40567 and 03891 are instances of zip-code. In traditional ontology storage instances must be captured as explicit visualization of a particular concept, this means, if one has to capture all the zip-codes in US as instances of a concept ZIP then one will have to add some 44000 instances, making it infeasible. The inventors of the present invention have determined that a better approach would be to allow a regular expression or some pattern like "zip code is 5 digit number". Various embodiments of the invention are able to provide this facility as instances are stored in their own separate table and it is very easy to capture regular expression in a column.

Figure 4:
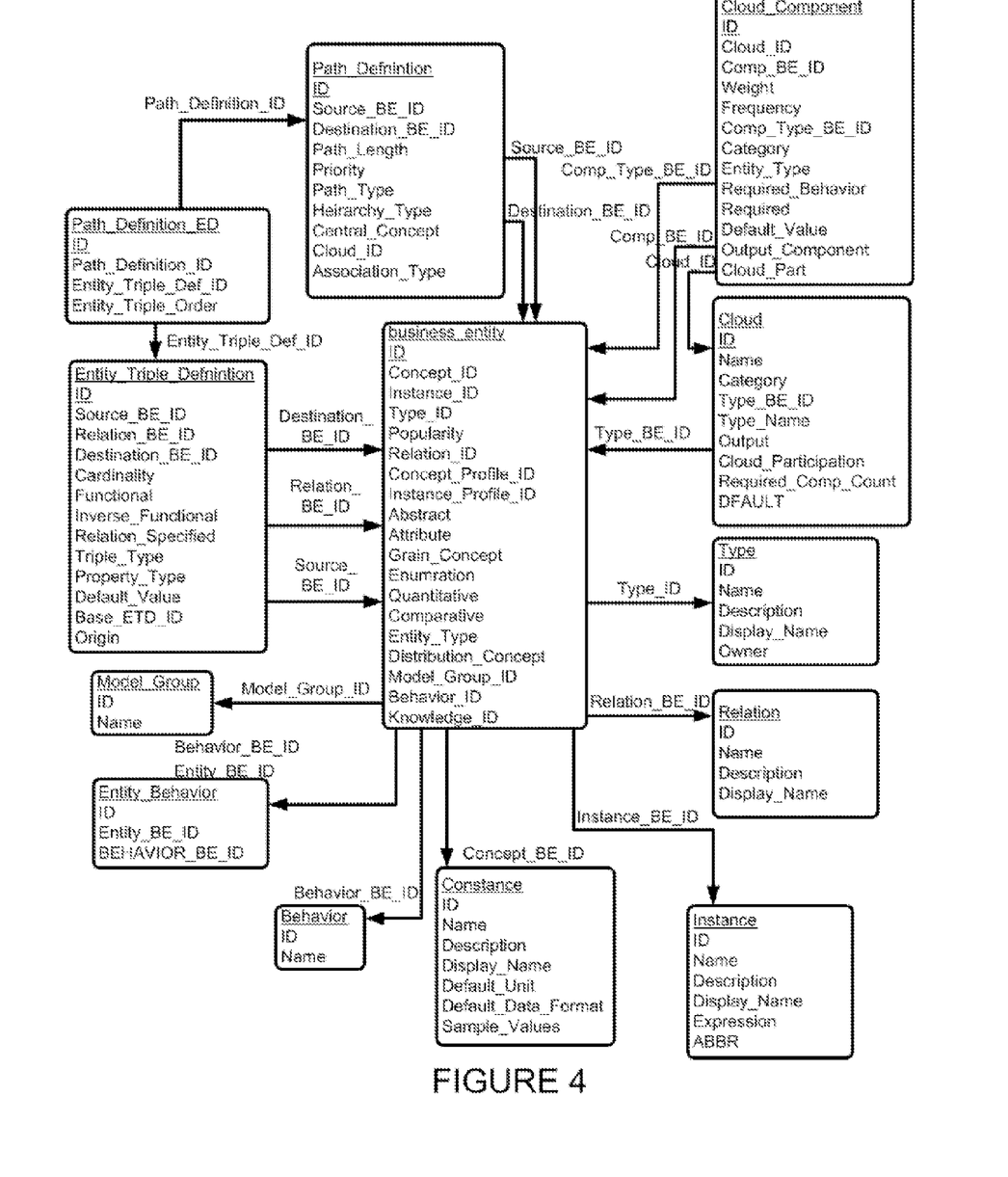
FIG. 4 depicts a set of tables and interrelationships therebetween in accordance with an embodiment of the invention

Referring to FIG. 4, depicting a table interrelation structure that may be considered during the description of all tables in this application, another table may be provided in accordance with one or more embodiments of the present invention called Domain-Entities or Business-Entities. Each of these types of entities may be specified in order to attach Instances to multiple concepts. Instances need only be specified only once, abut may be reused to attach them to different concepts. For example, Arnold Schwarzenegger may be specified only once as an instance, but may be attached to different concepts like Politician, Bodybuilder and Actor.

Figure 2:
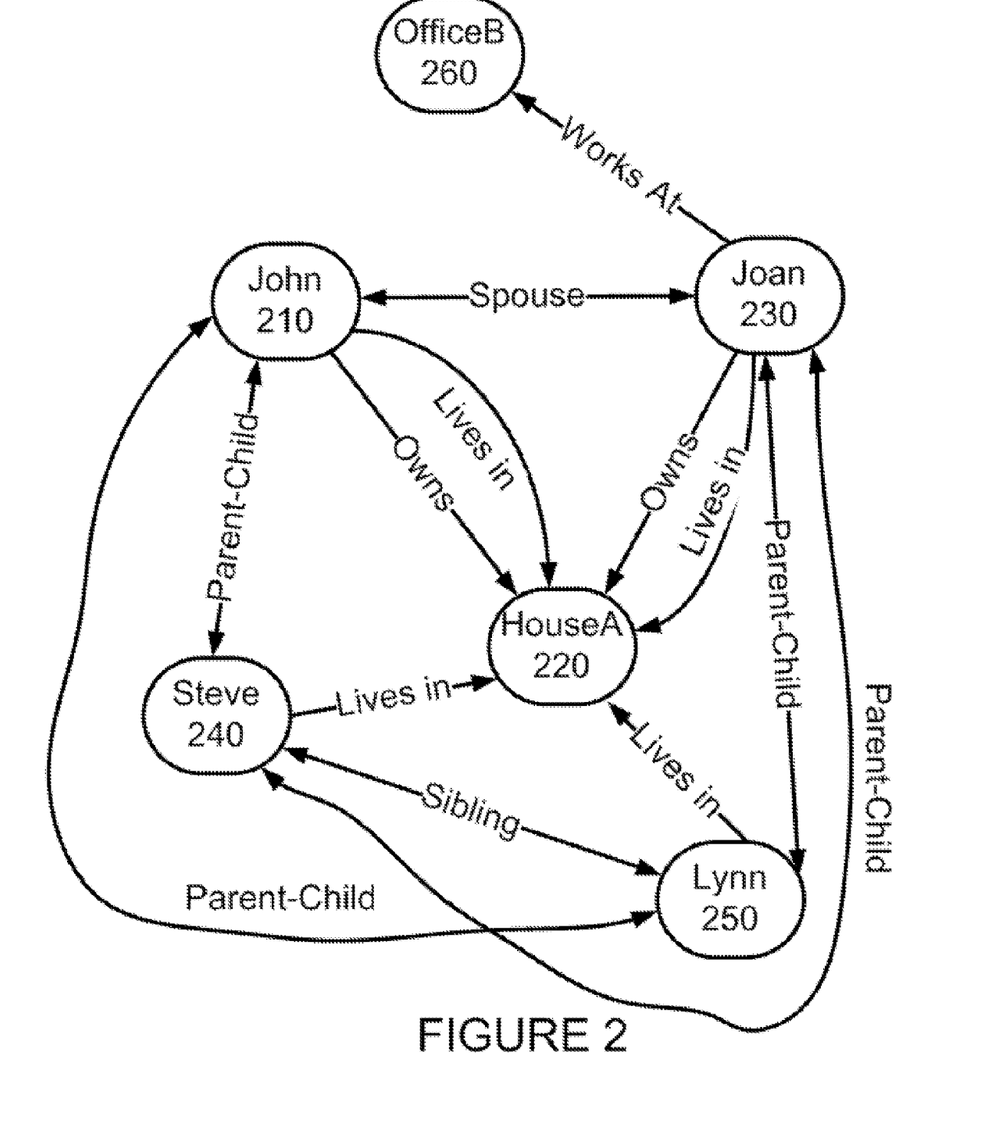
FIG. 2 is a representation of various instances and their possible interrelationships.

Knowledge base is built through various interconnections of the various concepts and instances with any number of other concepts and instances, forming a virtual web of information. An example of a small portion of such a web is shown in FIG. 2. Thus, in the above example, while John 210 is shown with a relationship (owning) a particular HouseA 220, John may be a spouse of Joan 230, who may also own HouseA 220. Joan and John both also live in HouseA 220. Steve 240 and Lynn 250 (siblings) have parent-child relationships with John and Joan, and also both live in HouseA. Further, Joan may have a relationship with a particular OfficeA 250, etc. In this manner, a web of interrelationships may be built. As should be noted, each time (in this case) an instance is added to a knowledgebase, all relationships between that particular instance and other instances is determined and predefined so that the various links can be properly added. Thus, later when a query is posited, information can be determined, and via the predefined relationships, huge knowledge webs or "graphs" may be traversed to find various data. As can be determined, this requires a substantial amount of up front work, defining the various relationships. Furthermore, as the size of each graph grows with the addition of information, the time to traverse these graphs in response to a user query grows with the size of the graph, and thus with the amount of information.

As specified above, ontologies may also capture interaction between various entities i.e. concepts and instances in constructs called relations. Such relations are termed as Object-Property and Datatype-Property in OWL format, based on their end-points. In accordance with one or more embodiments of the present invention, each relation is preferably captured independently of any entities it connects. This provides some advantage over the existing approach of relations not existing without being attached to the source or subject from which it originates. By detaching relations from their end-points, The inventive solution facilitates reuse of these relations. For example, let us take relation "eats" which connects "Herbivore" to "Plants". Now if one wants to create similar association between "Carnivore" and "Meat", the same relation cannot be reused easily in OWL. Indeed, the only way to do so is to create a union concept of "carnivore" and "herbivore" and assign "eats" as a property for the new union class and attach another union class of "plant" and "meat" to it as range or end-point. This means in order to get correct pairing between the elements in the union classes, additional restrictions and rules must be applied, making such arrangement quite difficult to add new knowledge as well as querying it. In the inventive solution, as relations are specified independently in a separate table, one need not bother about such union sets and may simply reuse any relation to create two separate distinct triples, thus making it very easy to add new knowledge as well as query the new knowledge.

In accordance with further embodiments of the present invention, triples may also be stored in relational tables. Embodiments of the invention may differentiate between Concept level and Instance level triples and store them in separate tables. As noted above, a Triple has three parts, and each part can be viewed as separate column resulting in a table structure for the Triples. Also each Triple may have multiple attributes associated with it captured as columns. Cardinality, Functional, Inverse Functional, Symmetric, Transitive etc. are some of the attributes that may be captured. Combined with a triples table, different entities may be connected with these relations, thus effectively reusing such relations, and therefore reducing the overall information burden on the system. Thus, an advantage of providing independent status to relations is the ability of reuse.

In accordance with various additional embodiments of the invention, instances may also be reused, similar to the manner described above with respect to relations. In more traditional formal ontology languages such as OWL and RDF, URIs may be employed to denote ontological resources and hence instances with same name in same namespace are not allowed. Thus, in these traditional constructs, the only way to achieve this (i.e. allowing the use of similar instances in a same namespace) is to define those instances in different ontology with different namespaces and then use them together. This of course requires a different name for each instance associated with each ontological triple, and therefore is unscalable and may become difficult when large knowledge bases are involved. This may be particularly difficult when employing the construct to utilize the inventive semantic web, and in particular when using such a semantic web to recognize natural language content. A more scalable approach is necessary. Therefore, in accordance with the present invention, by allowing for the use of a relational database table to store Instances and then using another table to connect those instances and concepts together to create valid entities, thus allowing reuse of instances in multiple triples and other ontological entities.

As noted above, ontology is not just collection of disconnected triples. Entities are interconnected essentially generating a well-connected graph structure. This means, entities may be connected indirectly to each other also through other entities. For example, Person owns a House and House has a Roof. This means Person and Roof are also connected. Many times these multi-level connections are important to answer a query. As more detailed level information is captured, more levels may be added between two entities' connection. Navigating and finding these connections in real time or at run time may be more time consuming and not a scalable approach. This is the traditional approach taken by inference engines working on top of OWL/RDF. Additionally, it should be noted that pre-computing these navigational connections and storing them would also become less and less feasible. As the amount of knowledge increases, such connections will grow exponentially, soon making it too expensive to compute. Embodiments of the invention preferably handle this situation by storing these connections in an inventive way. These multi-level navigational connections as are treated as PATHs.

Each PATH is composed of a set of ordered triples. Thus storing even a big path becomes a simple matter of storing an ordered list of numbers representing triples. Storing information in this manner allows an engine to find a connection i.e. Path by its component triples. A triple in turn is found by querying by its component entities. Thus a simple two level sql querying arrangement can easily get information to answer a question even when it is not a well-formed question. Similarly, when new knowledge is added, one just needs to know its preceding triple and its number so that a new triple can be just added in front of it, essentially giving a new path without too much computation.

Owl Constructs. The Table set forth in FIG. 3 looks at all the Owl-DL constructs in the first column and shows how they are addressed in accordance with various embodiments of the present invention in the second column. As is shown, while many of the inventive concepts have similarities in the more traditional ontological construct, the additional functionality and resources provided in accordance with the various embodiments of the present invention are quite substantial.

In further embodiments of the present invention, an innovative 3 plane architecture for storing knowledge base is proposed. According to this approach, a number of new constructs are defined such as TYPEs, BEHAVIORs and CLOUDs. These new constructs help the user in adding and accessing knowledge more efficiently. To do so, storing these constructs along with the more traditional ontological material in relational database in the manner noted above is instrumental.

TYPEs may be stored in separate tables. Using one or more Domain-Entities table, these TYPEs are associated to each other and to the other ontological entities. As all concepts, instances, relations and types are specified in Domain-Entities table, it is very easy to create a single reverse index on top of them to access them very efficiently.

BEHAVIORs may also be specified in a separate table and may be attached to different domain-entities using another relational table called Entity-Behavior. These BEHAVIORs are used by the inventive system to aid reasoning.

Clouds an additional inventive construct, and may be stored using multiple relation tables, one to store the Meta information of each cloud and another to store its components and their attributes. Storing such clouds in relational database makes it easier to identify clouds based on their components existing in user specified content. Clouds, as will be described above, comprise groups of other ontological entities, and relations between them.

A Plane 3 of the inventive architecture contains rules, formulas and patterns that can be associated to entities and clouds. All these rules and formulas may also be stored in relational tables which make it easier to associate them to entities and clouds by using linking tables. As one can see relational database storage aids the inventive knowledge base architecture to facilitate very efficient, easy and scalable approach to add and access knowledge for the user.

Information Retrieval

Retrieving information in accordance with embodiments of the invention may be performed in many ways. Being in pure relation database format, information retrieval may be performed with simple SQL. Here are few illustrating examples.

Getting all Concepts
  select name, display-name, description from concept
Getting all Concepts and its Instances
  select c.name, i.name, i.display-name, i. description
  from concept c, instance I, business-entity be
  where be.concept-id=c.id and be.instance-id=i.id
Retrieving properties of a concept
  select c.name, r.name
  from concept c, relation r, concept-triple t, business-entity
    beCpt, business-entity beRel
  where beCpt.concept-id=c.id and beRel.relation-id=r.id
  and t.source-be-id=beCpt.id and t.relation-be-id=beRel.id
Retrieving triples with specific Domain i.e. Source Concept
  select t.*
  from concept c, concept-triple t, business-entity be
  where be.concept-id=c.id and t.source-be-id=be.id
  and c.name=CONCEPT-NAME
Retrieving triples with a specific Range i.e. Destination Concept
  select t.*
  from concept c, concept-triple t, business-entity be
  where be.concept-id=c.id and t.destination-be-id=be.id
  and c.name=CONCEPT-NAME
Retrieving all connections (triples) for a specific instances
  select it.*
  from instance i, instance-triple it, business-entity be
  where be.instance-id=i.id and t.source-be-id=be.id
  and i.name=INSTANCE-NAME
Retrieving all instances triples matching a specific concept triple
  select it.*
  from instance-triple it, concept-triple t
  where it.concept-triple-id=t.id In accordance with embodiments of the invention, an API may be provided on top of the ontology storage to retrieve data by querying in English or other simple, well known language construct. On top of the basic SQL querying, in accordance with various embodiments, users may provide more intricate queries for use with the invention.

Some of the advantages of the various embodiments of the invention are as follows:

Reuse of Relations—
As relations are given independent status and stored separately they can be reused to connect completely separate pairs of concepts without worrying of complicated union classes and valid pairing restrictions.

Reuse of Instances—
Instances are also independent entities and exist on their own and attached to concepts as needed by context or domain. Thus avoiding duplicating instances which helps in easier knowledge management.

Dynamic Instances—
Instances do not need to be explicitly mentioned. A regular expression can be specified to identify similar type of multiple instances.

Therefore, in accordance with various embodiments of the invention, an efficient way of storing Ontologies in relational databases is provided. This inventive approach is different from the prior art at least in that it does not expect the user to know RDF structure. Embodiments of the invention may provide an API and software built on top of that API which enables users to query using simple English or other well-known language.

Storing knowledgebase in relational databases and being able to reuse instances allows user to store linked data more efficiently using this storage solution. Tim Berners-Lee outlined four principles regarding the use and manipulation of Linked Data in his Design Issues: Linked Data note. He suggests the following:

Use Uniform Resource Identifiers (URIs) to identify things.

Use HTTP URIs so that these things can be referred to and looked up ("dereferenced") by people and user agents, thus comprising such linked data.

Provide useful information about an entity when its URI is dereferenced, using standard formats such as RDF/XML.

Include links to other, related URIs in the exposed data to improve discovery of other related information on the Web.

In such a manner, data can be provided and linked across various data storage locations and the World Wide Web, as desired.

In accordance with embodiments of the invention, each entity i.e. concepts, instances and relations have an HTTP URI associated therewith which may be preferably stored in an entity-uri column of various respective tables. Embodiments of the invention also provide a reverse index from the URI to the entity, thus enabling a user to be able to reach an entity including linked data through URI over the web. This satisfies first three important principles noted above.

The fourth noted principle requires the publisher of any type of linked data to be aware of other references over the web made to entities involved in that content. This is not always possible and hence the advantage of linked data i.e. linking across web is lost in many cases.

The present invention addresses this shortcoming by using generic layer i.e. plane 1. TYPEs defined in this plane 1, which allows a publisher of linked data to be not worried about knowledge of other linked information on the web as long as the other publishers are also using the inventive ontology storage to publish. In which case, the inventive storage system and inference engine preferably identifies potential matches based on TYPEs even at querying time very efficiently.

In accordance with further embodiments of the invention, unstructured content available stored locally or remotely may be linked to the one or more ontological entities or triples stored in accordance with the invention. Thus, one or more unstructured documents, and portions thereof may be indexed to one or more stored ontological constructs. Thus, upon employment of the present invention, if one or more of such ontological entities are determined to be responsive to a particular query, for example, it is therefore each to indicate all unstructured content documents that correspond to such ontological construct, and therefore can easily determine all documents that may be an appropriate response to the query.

Embodiments of the present invention may be employed on various appropriate computer systems, providing sufficient computing power and storage means. Access to such computing system may be provided to one or more users in any manner, such as via a web portal, direct connection, or other access.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that this description is intended to cover all of the generic and specific features of the invention herein described and all statements of the scope of the invention which, as a matter of language, might be said to fall there between.

What is claimed:

1. A method for capturing ontologies in a relational database, comprising the steps of:
    storing to a non-transitory computer readable storage medium one or more instances as a first entity in a first table of the relational database;
    storing to the non-transitory computer readable storage medium one or more concepts as a second entity in a second table of the relational database;
    storing to the non-transitory computer readable storage medium one or more relationship definitions for defining one or more relationships between one or more entities in a third table of the relational database, each of the one or more relationship definitions being stored independent of any other entities;
    storing to the non-transitory computer readable storage medium one or more type entities with which each of the one or more of concepts and instances are associated in a fourth table of the relational database, each type entity defining one or more formats of entities associated therewith;
    storing to the non-transitory computer readable storage medium one or more cloud entities in a fifth table of the relational database, each cloud entity comprising one or more attributes with which all entities associated therewith also comprise;
    storing to the non-transitory computer readable storage medium one or more behavior entities in a sixth table of the relational database, each behavior entity comprising one or more behavior definitions with which all entities associated therewith also comprise;
    defining one or more domain entity table records of valid combinations of one or more of instance entities, concept entities, type entities and relationship entities in accordance with knowledgebase associated with one or more defined domains; wherein one or more documents of unstructured content may be referenced by one or more of the domain entity table records if a record in the domain entity table matches a portion of the knowledge representation of the unstructured content.

2. The method of claim 1, wherein the one or more instances, concepts and relationship definitions are stored independently of any other entity in the relational database.

3. The method of claim 1, wherein the one or more instances and concepts are stored in a relational database independent of any relationship definitions.

4. The method of claim 1, wherein one or more of the one or more relationship definitions is reused between multiple pairs of instances and concepts.

5. The method of claim 1, wherein each of the one or more instances may be associated with one or more concepts.

6. The method of claim 5, wherein the one or more instances are associated with one or more data storage locations containing linked data.

7. The method of claim 1, wherein the unstructured content is a web page.

8. The method of claim 1, wherein the unstructured content is a document.

9. The method of claim 1, wherein a knowledge representation of the unstructured content is obtained by querying all domain entity table records referencing the unstructured content.

10. The non-transitory computer readable storage medium comprising a computer program, the computer program causing a general purpose computer to perform the steps of:
    storing to a non-transitory computer readable storage medium one or more instances as a first entity in a first table of the relational database;
    storing to the non-transitory computer readable storage medium one or more concepts as a second entity in a second table of the relational database;
    storing to the non-transitory computer readable storage medium one or more relationship definitions for defining one or more relationships between one or more entities in a third table of the relational database, each of the one or more relationship definitions being stored independent of any other entities;
    storing to the non-transitory computer readable storage medium one or more type entities with which each of the one or more of concepts and instances are associated in a fourth table of the relational database, each type entity defining one or more formats of entities associated therewith;
    storing to the non-transitory computer readable storage medium one or more cloud entities in a fifth table of the relational database, each cloud entity comprising one or more attributes with which all entities associated therewith also comprise;
    storing to the non-transitory computer readable storage medium one or more behavior entities in a sixth table of the relational database, each behavior entity comprising one or more behavior definitions with which all entities associated therewith also comprise;
    defining domain entity table records of valid combinations of one or more of instance entities, concept entities, type entities and relationship entities in accordance with knowledgebase associated with one or more defined domains; wherein one or more documents of unstructured content may be referenced by one or more of the domain entity table if a record in the domain entity table matches a portion of the knowledge representation of the unstructured content.

11. The storage medium of claim 10, wherein the one or more instance entities, concept entities and relationship entities are stored independently in the relational database.

12. The storage medium of claim 10, wherein one or more of the one or more relationships is reused between multiple pairs of instances and concepts.

13. The storage medium of claim 10, wherein the one or more instances are associated with one or more data storage locations containing linked data.

14. The method of claim 10, wherein a knowledge representation of the unstructured content is obtained by querying all domain entity table records referencing the unstructured content.

15. A system for storing ontologies in a relational database, comprising:
    a processor storing to a non-transitory computer readable storage medium one or more instances as a first entity in a first table of the relational database, storing to the non-transitory computer readable storage medium one or more concepts as a second entity in a second table of the relational database, storing to the non-transitory computer readable storage medium one or more relationship definitions for defining one or more relationships between one or more entities in a third table of the relational database, each of the one or more relationship definitions being stored independent of any other entities, storing to the non-transitory computer readable storage medium one or more type entities with which each of the one or more of concepts and instances are associated in a fourth table of the relational database, each type entity defining one or more formats of entities associated therewith, storing to the non-transitory computer readable storage medium one or more cloud entities in a fifth table of the relational database, each cloud entity comprising one or more attributes with which all entities associated therewith also comprise, storing to the non-transitory computer readable storage medium one or more behavior entities in a sixth table of the relational database, each behavior entity comprising one or more behavior definitions with which all entities associated therewith also comprise, and defining domain entity table records of valid combinations of one or more of instance entities, concept entities, type entities and relationship entities in accordance with knowledgebase associated with the one or more defined domains; wherein one or more documents of unstructured content may be referenced by one or more of the domain entity table if a record in the domain entity table matches a portion of the knowledge representation of the unstructured content.

16. The system of claim 15, wherein the one or more instance entities, concept entities and relationship entities are store independently in the relational database.

17. The system of claim 15, wherein the one or more of the one or more relationship entities is reused between multiple pairs of instances and concepts.

18. The system of claim 15, wherein the one or more instances are associated with one or more data storage locations containing linked data.

19. The system of claim 15, wherein a knowledge representation of the unstructured content is obtained by querying all domain entity table records referencing the unstructured content.

* * * * *